US009117156B2

(12) United States Patent
Hill

(10) Patent No.: US 9,117,156 B2
(45) Date of Patent: *Aug. 25, 2015

(54) RFID DEVICE HAVING LOW-LOSS BARIUM-BASED CERAMIC OXIDE

(71) Applicant: Skyworks Solutions, Inc., Woburn, MA (US)

(72) Inventor: Michael David Hill, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/035,099

(22) Filed: Sep. 24, 2013

(65) Prior Publication Data
US 2014/0124584 A1 May 8, 2014

Related U.S. Application Data

(63) Continuation of application No. 12/984,662, filed on Jan. 5, 2011, now Pat. No. 8,561,909.

(60) Provisional application No. 61/311,976, filed on Mar. 9, 2010.

(51) Int. Cl.
*G06K 19/06* (2006.01)
*G06K 19/077* (2006.01)

(52) U.S. Cl.
CPC ........ *G06K 19/07749* (2013.01); *G06K 19/077* (2013.01); *Y10T 29/49016* (2015.01)

(58) Field of Classification Search
CPC ............ H01L 2924/00; H01L 2224/16; H01L 2924/07811; H01L 2924/12032; H01L 2924/13091; H01L 2924/1461; H01L 21/31691; H01L 2223/6677; H01L 2224/16225; H01L 23/145; H01L 23/49855; H01L 27/105; G06K 19/07749; G06K 19/077; G06K 7/0008; G06K 7/10; G06K 19/02; G06K 19/0723; G06K 19/07745; G06K 19/07764; G06K 19/08; G06K 19/16; G06K 1/14; G06K 1/18; G06K 2017/0083; G06K 2017/009
USPC .......................... 235/492, 375, 486, 487, 491
See application file for complete search history.

(56) References Cited

U.S. PATENT DOCUMENTS

| 5,449,480 A | 9/1995 | Kuriya et al. |
| 8,561,909 B2 * | 10/2013 | Hill ............................. 235/492 |
| 2005/0001785 A1 * | 1/2005 | Ferguson et al. ............. 343/895 |

(Continued)

FOREIGN PATENT DOCUMENTS

| JP | 2006-351392 A | 12/2006 |
| WO | WO 2010/013810 A1 | 2/2010 |

OTHER PUBLICATIONS

International Preliminary Report on Patentability re International Application No. PCT/US2011/027496, dated Sep. 11, 2012.

(Continued)

*Primary Examiner* — Thien M Le
(74) *Attorney, Agent, or Firm* — Knobbe, Martens, Olson & Bear LLP

(57) ABSTRACT

An RFID chip is embedded in a device having a body that includes a low-dielectric loss material including at least one of barium stannate, barium cerate, barium tungstate and barium molybdate.

20 Claims, 2 Drawing Sheets

(56) References Cited

U.S. PATENT DOCUMENTS

| | | |
|---|---|---|
| 2006/0122865 A1 | 6/2006 | Preiss et al. |
| 2007/0131142 A1* | 6/2007 | Borland et al. .......... 106/287.19 |
| 2007/0139206 A1 | 6/2007 | Kikuchi et al. |
| 2009/0042642 A1* | 2/2009 | Nissen ............................ 463/25 |
| 2009/0186753 A1* | 7/2009 | Hill et al. ...................... 501/135 |
| 2009/0253002 A1* | 10/2009 | Brooks et al. ................... 429/17 |
| 2009/0264275 A1* | 10/2009 | Hill et al. ...................... 501/135 |
| 2011/0024853 A1 | 2/2011 | Sugiyama et al. |

OTHER PUBLICATIONS

International Search Report and Written Opinion re International Application No. PCT/US2011/027496, dated Oct. 28, 2011.

* cited by examiner

RFID DEVICE HAVING LOW-LOSS BARIUM-BASED CERAMIC OXIDE

CROSS-REFERENCE TO RELATED APPLICATION

This application is a continuation of U.S. patent application Ser. No. 12/984,662, filed Jan. 5, 2011, which claims the benefit of U.S. Provisional Patent Application No. 61/311,976, filed Mar. 9, 2010, the disclosures of which are hereby incorporated by reference in their entireties.

BACKGROUND

Radio frequency identification (RFID) technology is used in many applications to identify and determine the locations of various items. An example of RFID technology uses a passive RF device, also referred to as an RFID chip, embedded within or otherwise associated with an item. When the RFID device comes within range of a corresponding RFID transceiver, the presence of the RFID device is detected by the RFID transceiver.

One limitation of such a system is that the RFID device may be embedded in the item, causing the material from which the item is formed to attenuate the RF signal between the RFID device and the RFID transceiver, thus limiting the range over which the RFID transceiver can detect the presence of the RFID device. Therefore, it would be desirable to minimize attenuation of RF energy between the RFID device and the RFID transceiver.

SUMMARY

Embodiments of the invention relate to a device comprising a body including at least one of barium stannate, barium cerate, barium tungstate and barium molybdate, and an RFID chip disposed in the body. Embodiments of the invention also relate to a method comprising providing a body material including at least one of barium stannate, barium cerate, barium tungstate and barium molybdate, and embedding an RFID chip in the body material. Embodiments of the invention further relate to a ceramic oxide material that includes a low-dielectric constant modifier including at least one of a magnesium aluminum silicate, a magnesium silicate, a zinc silicate, silica, and talc.

Other systems, methods, features, and advantages of the invention will be or become apparent to one with skill in the art upon examination of the following figures and detailed description.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
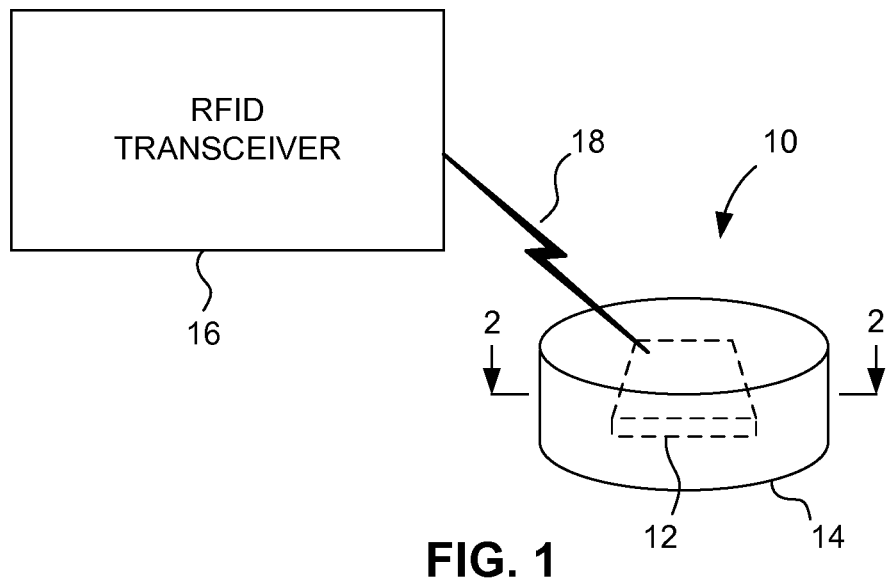
FIG. 1 illustrates a radio frequency identification (RFID) device having a body in which an RFID chip is embedded.
Figure 2:
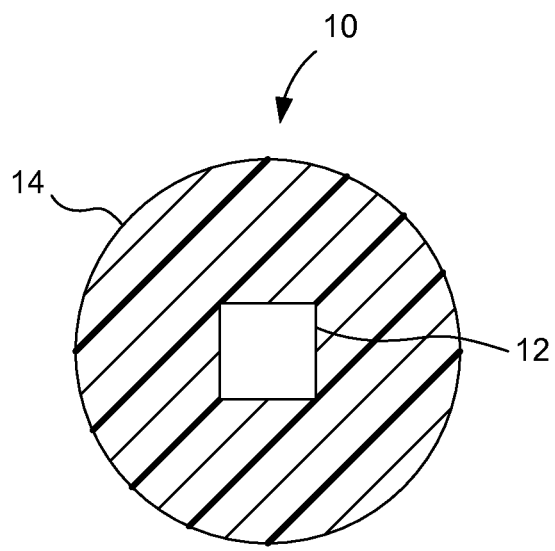
FIG. 2 is a cross-sectional view of the body of the device of FIG. 1, taken on line 2-2 of FIG. 1.

As illustrated in FIGS. 1-2, in an illustrative or exemplary embodiment of the invention, a radio frequency identification (RFID) device 10 includes an electronic RFID chip 12 embedded in a body 14. RFID chip 12 can be any passive or active RFID chip or similar device known in the art that can communicate information in the form of RF energy 18 with an RFID transceiver 16. As such RFID chips 12 are well known to persons skilled in the art, RFID chip 12 is not described in further detail herein.

In exemplary embodiments, body 14 can include a low-dielectric loss barium-based ceramic oxide and a binder material such as polyvinyl chloride (PVC) (or a derivative of PVC), in which the ceramic oxide particles are evenly distributed within the polymer-ceramic matrix of body 14. The low-dielectric loss ceramic oxide renders body 14 sufficiently transparent to RF (e.g., microwave) energy 18 to reliably communicate information between device 10 and RFID transceiver 16. The RF energy 18 emitted by RFID transceiver 16 can be, for example, in the wavelength range of approximately 100 megahertz (MHz) to approximately 18 gigahertz (GHz).

Figure 3:
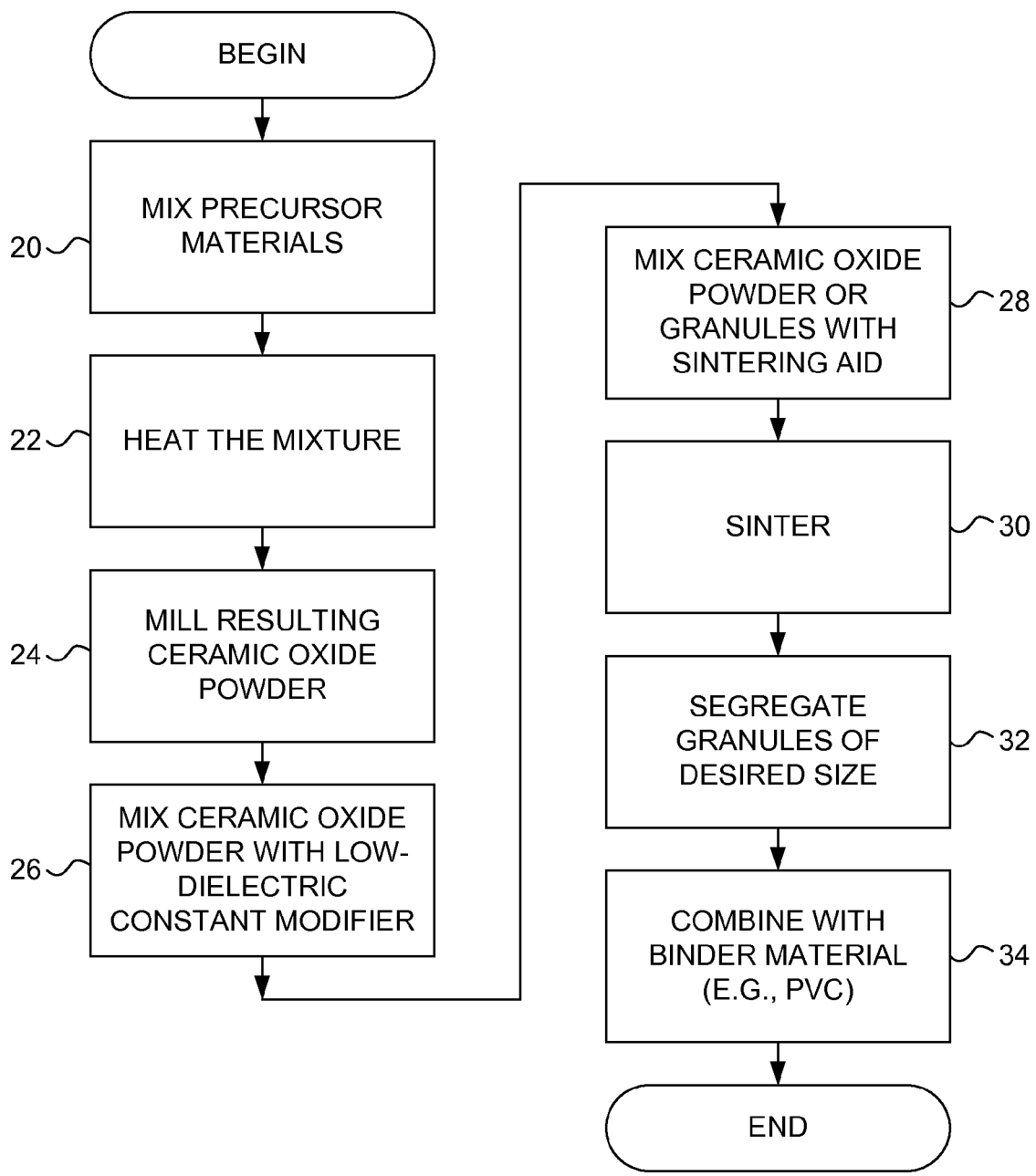
FIG. 3 is a flow chart illustrating an exemplary method of making the body material for the device of FIG. 1.

In one exemplary embodiment, the low-dielectric loss barium-based ceramic oxide comprises barium stannate (BaSnO.sub.3). An exemplary method for making low-dielectric loss barium-based ceramic oxide comprising barium stannate is described with reference to FIG. 3. At step 20, precursor materials comprising barium carbonate and tin oxide are weighed, mixed and blended together. The mixture can include in the range of about 54-59 percent barium carbonate by weight and in the range of about 41-46 percent tin oxide by weight. The barium carbonate and tin oxide can be mixed together by, for example, Cowles blending, vibratory mill blending, P-K Cross-flow blending (V-blending), or any other suitable mixing process known in the art. The barium carbonate and tin oxide can be mixed dry or, alternatively, mixed using water or water and alcohol. In an embodiment in which the barium carbonate and tin oxide are mixed wet, the mixture is dried before the next step 22.

At step 22, the mixture of barium carbonate and tin oxide is heated or calcined. The calcine process can be carried out in, for example, a ceramic vessel, such a porous aluminum oxide box (commonly referred to as a "sagger"), using a pure oxygen atmosphere or, alternatively, an air atmosphere. The mixture of barium carbonate and tin oxide can be heated to a temperature in the range of about 1100-1350 C. for a period in the range of about 4-16 hours. Preferably, the mixture is heated for 8-12 hours. The calcine process results in the production of barium stannate in the form of powder or granules. The barium stannate typically has a density of about 7.24 g/cc and a dielectric constant of about 26. At step 24, the barium stannate material is milled to a median article size in the range of about 1-10 .mu.m using, for example, Cowles blending, vibratory mill blending, V-blending, or any other suitable milling or mixing process known in the art.

Optionally, at step 26 the barium stannate material can be mixed with a low-dielectric constant modifier to reduce the dielectric constant of the resulting blend. The materials can be mixed dry or, alternatively wet-mixed using water or water or water and alcohol. If wet-mixed, the resulting mixture is dried before the next step 28. Suitable low-dielectric constant modifiers include a magnesium aluminum silicate (e.g., Cordierite), a magnesium silicate (e.g., Fosterite), a zinc silicate, a magnesium silicate, silica, and talc. The barium stannate material can be mixed with one or more of these low-dielectric constant modifiers. For example, a mixture can comprise about 50-65 percent by weight barium stannate (having a density of 7.24 g/cc) and about 35-40 percent by weight Cordierite (having a density of 2.45 g/cc). In this example, the resulting mixture has a density of about 5.00 g/cc and a dielectric constant of 14.

Optionally, the barium stannate ceramic powder (with or without the modifier) may be granulated to a coarser size using spray drying or pelletizing prior to sintering (step 30). An example of pelletizing is the use of an Eirich Blender.

Optionally, at step 28, the barium stannate ceramic powder can be mixed with a sintering aid that allows the sintering step 30 to be performed at a lower temperature. The sintering aid and the ceramic powder can be dry blended using, for example, Cowles blending, vibratory mill blending, V-blending, or any other suitable milling or mixing process known in the art. The barium stannate and sintering aid can be mixed dry or, alternatively wet-mixed using water or water or water and alcohol. If wet-mixed, the resulting mixture is dried before the sintering step 30. The sintering aid can include one or more of the following: copper oxide, lithium niobate, boron oxide, barium borate, barium tetraborate, barium tungstate, potassium niobate, tungsten oxide, barium molybdate, molybdenum oxide, potassium tantalate, potassium oxide, sodium niobate, sodium oxide, lithium tantalate, lithium oxide, manganese oxide, zinc oxide, calcium zirconate, strontium zirconate, tin oxide, calcium stannate, strontium stannate, magnesium stannate. Barium tungstate and barium molybdate compounds (described below) can also be used as sintering aids for barium stannate.

At step 30, the barium stannate (with or without sintering aid) is sintered in, for example, a ceramic vessel, such as a porous aluminum oxide box, using a pure oxygen atmosphere or, alternatively, an air atmosphere. Sintering allows for optimum densification of the ceramic powder to form larger (20-100 .mu.m diameter) granules.

An inorganic dye (e.g., iron oxide or cobalt chloride) can be added to the precursor mix or the barium stannate (with or without sintering aid) prior to sintering to add a desired color to the ceramic powder after calcining (step 22) or sintering (step 30).

At step 32, the sintered ceramic granules are then sorted or classified using sieves or other well known techniques to segregate the granules into sizes suitable for the desired use. For example, granules having a diameter in the range of about 10-100 .mu.m can be segregated for use in the next step 34.

At step 34, the sorted ceramic granules may be combined with a binder material, such as polyvinyl chloride (PVC). A suitable organic or inorganic dye can be added along with the PVC to produce a desired color in the final product. The amount of ceramic granules ranges from about 30 to 70 percent by weight in the final material. The final material can be used in a molding process to embed RFID chip 10 (FIG. 1).

In another exemplary embodiment, the low-dielectric loss barium-based ceramic oxide comprises barium cerate (BaCeO.sub.3). An exemplary method for making low-dielectric loss barium-based ceramic oxide comprising barium cerate is described with reference to FIG. 3. At step 20, precursor materials comprising barium carbonate and cerium oxide are weighed, mixed and blended together. The mixture can include in the range of about 50-55 percent barium carbonate by weight and in the range of about 45-50 percent cerium oxide by weight. The barium carbonate and cerium oxide can be mixed together by, for example, Cowles blending, vibratory mill blending, P-K Cross-flow blending (V-blending), or any other suitable mixing process known in the art. The barium carbonate and cerium oxide can be mixed dry or, alternatively, mixed using water or water and alcohol. In an embodiment in which the barium carbonate and cerium oxide are mixed wet, the mixture is dried before the next step 22.

At step 22, the mixture of barium carbonate and cerium oxide is heated or calcined. The calcine process can be carried out in, for example, a ceramic vessel, such a porous aluminum oxide box, using a pure oxygen atmosphere or, alternatively, an air atmosphere. The mixture of barium carbonate and cerium oxide can be heated to a temperature in the range of about 1100-1350 C for a period in the range of about 4-16 hours. Preferably, the mixture is heated for 8-12 hours. The calcine process results in the production of barium cerate in the form of powder or granules. The barium cerate typically has a density of about 6.29 g/cc and a dielectric constant of about 27. At step 24, the barium cerate material is milled to a median article size in the range of about 1-10 .mu.m using, for example, Cowles blending, vibratory mill blending, V-blending, or any other suitable milling or mixing process known in the art.

Optionally, at step 26 the barium cerate material can be mixed with a low-dielectric constant modifier to reduce the dielectric constant of the resulting blend. The materials can be mixed dry or, alternatively wet-mixed using water or water or water and alcohol. If wet-mixed, the resulting mixture is dried before the next step 28. Suitable low-dielectric constant modifiers include a magnesium aluminum silicate (e.g., Cordierite), a magnesium silicate (e.g., Fosterite), a zinc silicate, a magnesium silicate, silica, and talc. The barium cerate material can be mixed with one or more of these low-dielectric constant modifiers. For example, a mixture can comprise about 50-65 percent by weight barium cerate (having a density of 6.29 g/cc) and about 35-40 percent by weight Cordierite (having a density of 2.45 g/cc). In this example, the resulting mixture has a density of about 5.00 g/cc and a dielectric constant of 15.

Optionally, the barium cerate ceramic powder (with or without the modifier) may be granulated to a coarser size using spray drying or pelletizing prior to sintering (step 30). An example of pelletizing is the use of an Eirich Blender.

Optionally, at step 28, the barium cerate ceramic powder can be mixed with a sintering aid that allows the sintering step 30 to be performed at a lower temperature. The sintering aid and the ceramic powder can be dry blended using, for example, Cowles blending, vibratory mill blending, V-blending, or any other suitable milling or mixing process known in the art. The barium cerate and sintering aid can be mixed dry or, alternatively wet-mixed using water or water or water and alcohol. If wet-mixed, the resulting mixture is dried before the sintering step 30. The sintering aid can include one or more of the following: copper oxide, lithium niobate, boron oxide, barium borate, barium tetraborate, barium tungstate, potassium niobate, tungsten oxide, barium molybdate, molybdenum oxide, potassium tantalate, potassium oxide, sodium niobate, sodium oxide, lithium tantalate, lithium oxide, manganese oxide, zinc oxide, calcium zirconate, strontium zirconate, calcium cerate, strontium cerate, and magnesium cerate.

At step 30, the barium cerate (with or without sintering aid) is sintered in, for example, a ceramic vessel, such as a porous aluminum oxide box, using a pure oxygen atmosphere or, alternatively, an air atmosphere. Sintering allows for optimum densification of the ceramic powder to form larger (in the range of about 20-100 .mu.m diameter) granules.

An inorganic dye (e.g., iron oxide or cobalt chloride) can be added to the precursor mix or the barium cerate (with or without sintering aid) prior to sintering to add a desired color to the ceramic powder after calcining (step 22) or sintering (step 30).

At step 32, the sintered ceramic granules are then sorted or classified using sieves or other well known techniques to segregate the granules into sizes suitable for the desired use. For example, granules having a diameter in the range of about 10-100 .mu.m can be segregated for use in the next step 34.

At step 34, the sorted ceramic granules may be combined with a binder material, such as polyvinyl chloride (PVC). A suitable organic or inorganic dye can be added along with the PVC to produce a desired color in the final product. The amount of ceramic granules ranges from about 30 to 70 percent by weight in the final material. The final material can be used in a molding process to embed RFID chip 10 (FIG. 1).

In another exemplary embodiment, the low-dielectric loss barium-based ceramic oxide comprises barium tungstate (BaWO.sub.3). An exemplary method for making low-dielectric loss barium-based ceramic oxide comprising barium tungstate is described with reference to FIG. 3. At step 20, precursor materials comprising barium carbonate and tungsten oxide are weighed, mixed and blended together. The mixture can include in the range of about 41-51 percent barium tungstate by weight and in the range of about 49-59 percent tungsten oxide by weight. The barium carbonate and tungsten oxide can be mixed together by, for example, Cowles blending, vibratory mill blending, P-K Cross-flow blending (V-blending), or any other suitable mixing process known in the art. The barium carbonate and tungsten oxide can be mixed dry or, alternatively, mixed using water or water and alcohol. In an embodiment in which the barium carbonate and tungsten oxide are mixed wet, the mixture is dried before the next step 22.

At step 22, the mixture of barium carbonate and tungsten oxide is heated or calcined. The calcine process can be carried out in, for example, a ceramic vessel, such a porous aluminum oxide box, using a pure oxygen atmosphere or, alternatively, an air atmosphere. The mixture of barium carbonate and tungsten oxide can be heated to a temperature in the range of about 750-1100 C for a period in the range of about 4-16 hours. Preferably, the mixture is heated for 8-12 hours. The calcine process results in the production of barium tungstate in the form of powder or granules. The barium tungstate typically has a density of about 5.04 g/cc and a dielectric constant of about 8. At step 24, the barium tungstate material is milled to a median article size in the range of about 1-10 .mu.m using, for example, Cowles blending, vibratory mill blending, V-blending, or any other suitable milling or mixing process known in the art.

Optionally, at step 26 the barium tungstate material can be mixed with a low-dielectric constant modifier to reduce the dielectric constant of the resulting blend. The materials can be mixed dry or, alternatively wet-mixed using water or water or water and alcohol. If wet-mixed, the resulting mixture is dried before the next step 28. Suitable low-dielectric constant modifiers include a magnesium aluminum silicate (e.g., Cordierite), a magnesium silicate (e.g., Fosterite), a zinc silicate, a magnesium silicate, silica, and talc. The barium tungstate material can be mixed with one or more of these low-dielectric constant modifiers. For example, a mixture can comprise about 65-80 percent by weight barium tungstate (having a density of 5.04 g/cc) and about 20-35 percent by weight Fosterite (having a density of 2.89 g/cc). In this example, the resulting mixture has a density of about 4.50 g/cc and a dielectric constant of 6. Alternatively, a mixture can comprise about 70-85 percent by weight percent barium tungstate (having a density of 5.04 g/cc) and about 15-30 percent by weight Cordierite (having a density of 2.45 g/cc). In this alternative example, the resulting mixture has a density of about 4.50 g/cc and a dielectric constant of 6.

Optionally, the barium tungstate ceramic powder (with or without the modifier) may be granulated to a coarser size using spray drying or pelletizing prior to sintering (step 30). An example of pelletizing is the use of an Eirich Blender.

As sintering temperatures of barium tungstate are sufficiently low, the optional step 28 of adding a sintering aid can generally be omitted. However, copper oxide or borate-based materials can be used as a sintering aid to reduce sintering temperatures by about 100 C.

At step 30, the barium tungstate is sintered in, for example, a ceramic vessel, such as a porous aluminum oxide box, using a pure oxygen atmosphere or, alternatively, an air atmosphere. Sintering allows for optimum densification of the ceramic powder to form larger (20-100 .mu.m diameter) granules. An inorganic dye (e.g., iron oxide or cobalt chloride) can be added to the precursor mix or the barium tungstate prior to sintering to add a desired color to the ceramic powder after calcining (step 22) or sintering (step 30).

At step 32, the sintered ceramic granules are then sorted or classified using sieves or other well known techniques to segregate the granules into sizes suitable for the desired use. For example, granules having a diameter in the range of about 10-100 .mu.m can be segregated for use in the next step 34.

At step 34, the sorted ceramic granules may be combined with a binder material, such as polyvinyl chloride (PVC). A suitable organic or inorganic dye can be added along with the PVC to produce a desired color in the final product. The amount of ceramic granules ranges from about 30 to 70 percent by weight in the final material. The final material can be used in a molding process to embed RFID chip 10 (FIG. 1).

In another exemplary embodiment, the low-dielectric loss barium-based ceramic oxide comprises barium molybdate (BaMoO.sub.3). An exemplary method for making low-dielectric loss barium-based ceramic oxide comprising barium molybdate is described with reference to FIG. 3. At step 20, precursor materials comprising barium carbonate and molybdenum oxide are weighed, mixed and blended together. The mixture can include in the range of about 55-60 percent barium carbonate by weight and in the range of about 40-45 percent molybdenum oxide by weight. The barium carbonate and molybdenum oxide can be mixed together by, for example, Cowles blending, vibratory mill blending, P-K Cross-flow blending (V-blending), or any other suitable mixing process known in the art. The barium carbonate and molybdenum oxide can be mixed dry or, alternatively, mixed using water or water and alcohol. In an embodiment in which the barium carbonate and molybdenum oxide are mixed wet, the mixture is dried before the next step 22.

At step 22, the mixture of barium carbonate and molybdenum oxide is heated or calcined. The calcine process can be carried out in, for example, a ceramic vessel, such a porous aluminum oxide box, using a pure oxygen atmosphere or, alternatively, an air atmosphere. The mixture of barium carbonate and molybdenum oxide can be heated to a temperature in the range of about 750-1100 C for a period in the range of about 4-16 hours. Preferably, the mixture is heated for 8-12 hours. The calcine process results in the production of barium molybdate in the form of powder or granules. The barium molybdate typically has a density of about 4.945 g/cc and a dielectric constant of about 9. At step 24, the barium molybdate material is milled to a median article size in the range of about 1-10 .mu.m using, for example, Cowles blending, vibratory mill blending, V-blending, or any other suitable milling or mixing process known in the art.

Optionally, at step 26 the barium molybdate material can be mixed with a low-dielectric constant modifier to reduce the dielectric constant of the resulting blend. The materials can be mixed dry or, alternatively wet-mixed using water or water or water and alcohol. If wet-mixed, the resulting mixture is dried before the next step 28. Suitable low-dielectric constant modifiers include a magnesium aluminum silicate (e.g., Cordierite), a magnesium silicate (e.g., Fosterite), a zinc silicate, a magnesium silicate, silica, and talc. The barium molybdate material can be mixed with one or more of these low-dielectric constant modifiers. For example, a mixture can comprise about 63-77 percent by weight barium molybdate (having a density of 4.945 g/cc) and about 23-37 percent by weight Fosterite (having a density of 2.89 g/cc). In this example, the resulting mixture has a density of about 4.50 g/cc and a dielectric constant of 6. Alternatively, a mixture can comprise about 67-82 percent by weight percent barium molybdate (having a density of 5.04 g/cc) and about 18-33 percent by weight Cordierite (having a density of 2.45 g/cc). In this alternative example, the resulting mixture has a density of about 4.50 g/cc and a dielectric constant of 6.

Optionally, the barium molybdate ceramic powder (with or without the modifier) may be granulated to a coarser size using spray drying or pelletizing prior to sintering (step 30). An example of pelletizing is the use of an Eirich Blender.

As sintering temperatures of barium molybdate are sufficiently low, the optional step 28 of adding a sintering aid can generally be omitted. However, copper oxide or borate-based materials can be used as a sintering aid to reduce sintering temperatures by about 10.degree. C.

At step 30, the barium molybdate is sintered in, for example, a ceramic vessel, such as a porous aluminum oxide box, using a pure oxygen atmosphere or, alternatively, an air atmosphere. Sintering allows for optimum densification of the ceramic powder to form larger (20-100 .mu.m diameter) granules. An inorganic dye (e.g., iron oxide or cobalt chloride) can be added to the precursor mix or the barium molybdate prior to sintering to add a desired color to the ceramic powder after calcining (step 22) or sintering (step 30).

At step 32, the sintered ceramic granules are then sorted or classified using sieves or other well known techniques to segregate the granules into sizes suitable for the desired use. For example, granules having a diameter in the range of about 10-100 .mu.m can be segregated for use in the next step 34.

At step 34, the sorted ceramic granules may be combined with a binder material, such as polyvinyl chloride (PVC). A suitable organic or inorganic dye can be added along with the PVC to produce a desired color in the final product. The amount of ceramic granules ranges from about 30 to 70 percent by weight in the final material. The final material can be used in a molding process to embed RFID chip 10 (FIG. 1).

While various embodiments of the invention have been described, it will be apparent to those of ordinary skill in the art that many more embodiments and implementations are possible that are within the scope of this invention. Accordingly, the invention is not to be restricted except in light of the following claims.

What is claimed is:

1. A method comprising:
   providing a precursor mixture including a barium-based substance;
   heating the precursor mixture to form a low-dielectric loss barium-based ceramic oxide;
   providing a body material including the low-dielectric loss barium-based ceramic oxide; and
   embedding a radio frequency identification (RFID) device in the body material.

2. The method of claim 1 wherein providing a body material further includes mixing with the ceramic oxide a low-dielectric constant modifier including at least one of a magnesium aluminum silicate, a magnesium silicate, a zinc silicate, silica, and talc.

3. The method of claim 2 wherein providing a body material further includes sintering the mixture of ceramic oxide and low-dielectric constant modifier to produce ceramic oxide granules having a diameter in the range of about 20 micrometers to 100 micrometers.

4. The method of claim 3 wherein providing a body material further includes, prior to sintering the mixture of ceramic oxide and low-dielectric constant modifier, adding a sintering aid including at least one of copper oxide, lithium niobate, boron oxide, barium borate, barium tetraborate, barium tungstate, potassium niobate, tungsten oxide, barium molybdate, molybdenum oxide, potassium tantalite, potassium oxide, sodium niobate, sodium oxide, lithium tantalite, lithium oxide, manganese oxide, zinc oxide, calcium zirconate, and strontium zirconate.

5. The method of claim 3 wherein providing a body material further includes, prior to sintering the mixture of ceramic oxide and low-dielectric constant modifier, adding a sintering aid including at least one of calcium stannate, strontium stannate, and magnesium stannate.

6. The method of claim 3 wherein providing a body material further includes, prior to sintering the mixture of ceramic oxide and low-dielectric constant modifier, adding a sintering aid including at least one of calcium cerate, strontium cerate, and magnesium cerate.

7. The method of claim 3 wherein providing a body material further includes, prior to sintering the mixture of ceramic oxide and low-dielectric constant modifier, adding a sintering aid including at least one of a copper oxide and a borate-based material.

8. The method of claim 3 wherein providing a body material further includes mixing the ceramic oxide granules with a binder material to produce the body material.

9. The method of claim 1 wherein the barium-based substance includes barium carbonate.

10. The method of claim 9 wherein the precursor mixture further includes cerium oxide.

11. The method of claim 9 wherein the precursor mixture further includes tungsten oxide.

12. The method of claim 9 wherein the precursor mixture further includes molybdenum oxide.

13. A device comprising:
    a body including a mixture of a binder material and low-dielectric loss barium-based ceramic oxide granules, the low-dielectric loss barium-based ceramic oxide granules having a diameter in the range of about 20 micrometers to 100 micrometers; and
    a radio frequency identification (RFID) device disposed in the body material.

14. The device of claim 13 wherein the low-dielectric loss barium-based ceramic oxide granules contribute to from between about 30 to 70 percent of the weight of the body.

15. The device of claim 13 wherein the barium-based ceramic oxide granules include at least one of barium stannate, barium cerate, barium tungstate, and barium molybdate.

16. The device of claim 13 wherein the body further includes at least one of a magnesium aluminum silicate, a magnesium silicate, a zinc silicate, silica, and talc.

17. The device of claim 13 wherein the binder material includes polyvinyl chloride.

18. The device of claim 13 wherein the RFID device is configured for radiofrequency communication in a wavelength range falling somewhere between approximately 100 megahertz and approximately 18 gigahertz.

19. The device of claim 13 wherein the RFID device includes a passive RFID chip.

20. A portable wireless device comprising:
- a body including a mixture of a binder material and low-dielectric loss barium-based ceramic oxide granules, the low-dielectric loss barium-based ceramic oxide granules having a diameter in the range of about 20 micrometers to 100 micrometers; and
- a radio frequency identification (RFID) device disposed in the body material and configured for wireless radiofrequency communication.

* * * * *